(12) United States Patent
Shamir et al.

(10) Patent No.: US 7,337,808 B2
(45) Date of Patent: Mar. 4, 2008

(54) BIMODAL FLEXIBLE-RIGID HOSE

(76) Inventors: Menashe Shamir, 4, Sahlav st., Kiryat Bialik 27077 (IL); Ray King, 11/4, Ha'Shzif st., Nesher 36847 (IL); Samuel Rosenbaum, 7, Alonim st., Kiryat Tivon 36041 (IL)

( * ) Notice: Subject to any disclaimer, the term of this patent is extended or adjusted under 35 U.S.C. 154(b) by 377 days.

(21) Appl. No.: 11/008,038

(22) Filed: Dec. 9, 2004

(65) Prior Publication Data

US 2005/0103903 A1   May 19, 2005

(51) Int. Cl.
*F16L 27/04* (2006.01)
*B05B 15/08* (2006.01)

(52) U.S. Cl. ............ 138/120; 138/155; 285/146.1; 285/146.3; 239/587.2; 239/587.3; 239/588; 248/276.1

(58) Field of Classification Search ............ 138/120, 138/155; 239/587.2, 587.3, 587.4, 587.5, 239/588; 285/146.1, 146.3; 4/599; 248/276.1
See application file for complete search history.

(56) References Cited

U.S. PATENT DOCUMENTS

| | | | | |
|---|---|---|---|---|
| 2,510,198 A | * | 6/1950 | Tesmer | 248/229.25 |
| 3,096,962 A | * | 7/1963 | Meijs | 248/276.1 |
| 3,168,274 A | * | 2/1965 | Street | 248/176.3 |
| 3,929,164 A | * | 12/1975 | Richter | 138/120 |
| 5,348,259 A | * | 9/1994 | Blanco et al. | 248/276.1 |
| 5,865,378 A | * | 2/1999 | Hollinshead et al. | 239/587.1 |
| 5,899,425 A | * | 5/1999 | Corey, Jr. et al. | 248/276.1 |
| 6,164,570 A | * | 12/2000 | Smeltzer | 239/588 |
| 6,648,376 B2 | * | 11/2003 | Christianson | 285/146.1 |
| 7,066,411 B2 | * | 6/2006 | Male et al. | 239/587.1 |

* cited by examiner

*Primary Examiner*—Patrick F. Brinson
(74) *Attorney, Agent, or Firm*—Angenehm Law Firm, Ltd.; N Paul Friederichs

(57) ABSTRACT

The present invention provides a flexible hose easily converted to a rigid hose. The flexible-rigid bimodal hose comprises a plurality of adjacently engaged hollow members defining a tube having a first end, a second end, and an elongated hollow. A flexible tube as well as a cable pass through the hollow and extend therethrough. The cable acts as a means to apply tension on the hollow members. The hose has a flexible state in which each one of the hollow members is rotating in respect to neighboring hollow member and a rigid state in which the hollow members are forced together by the cable so that there is no relative movement between neighboring hollow members. An actuation means, which can be mechanically or hydraulically operated, is adapted to apply different tensile forces on the cable.

18 Claims, 17 Drawing Sheets

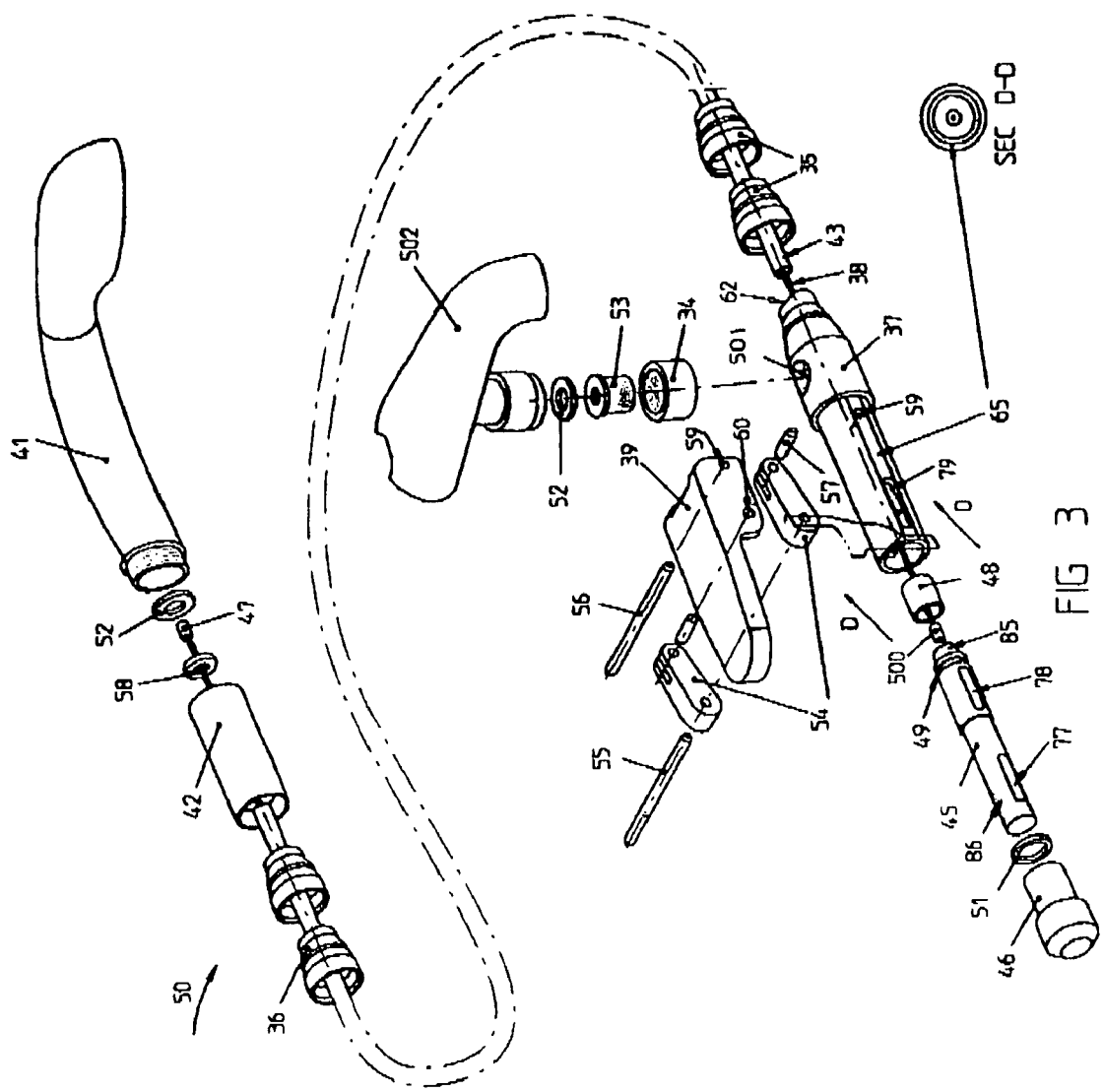

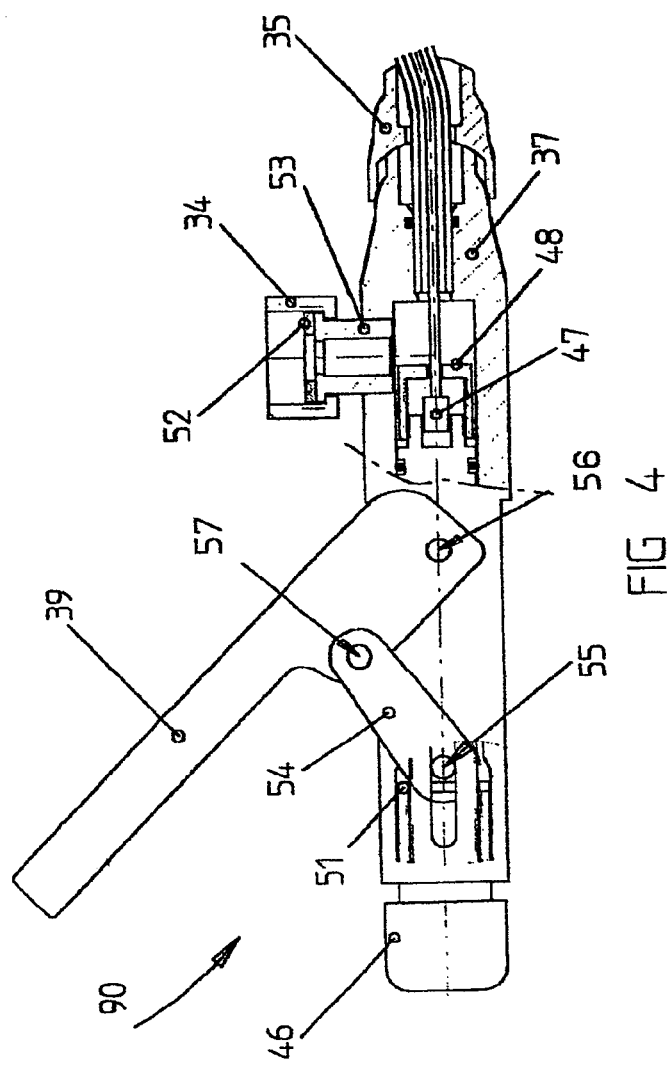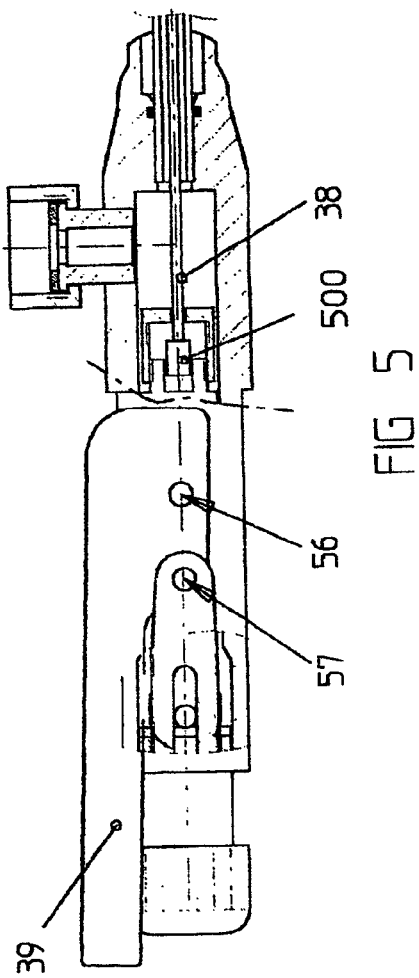

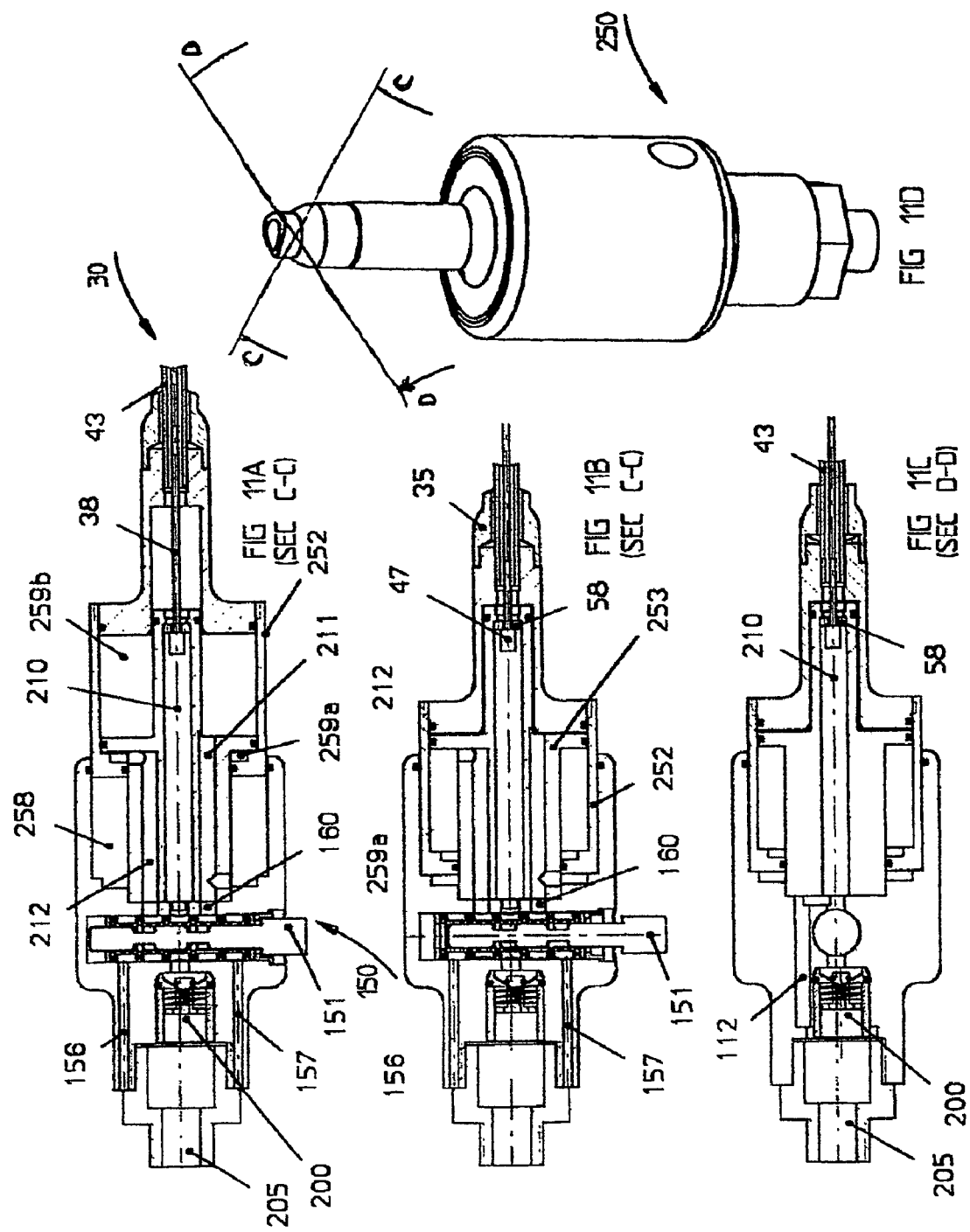

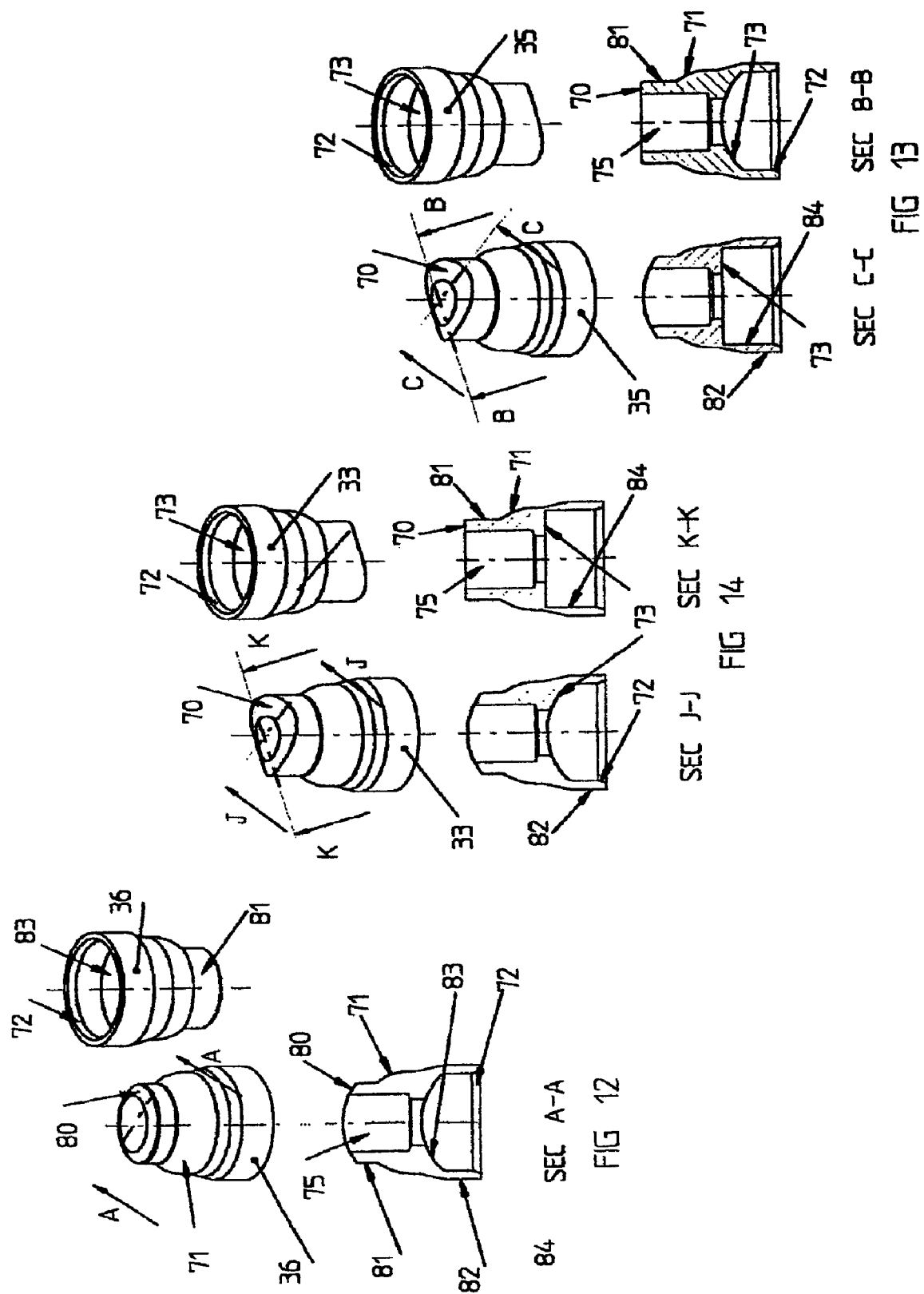

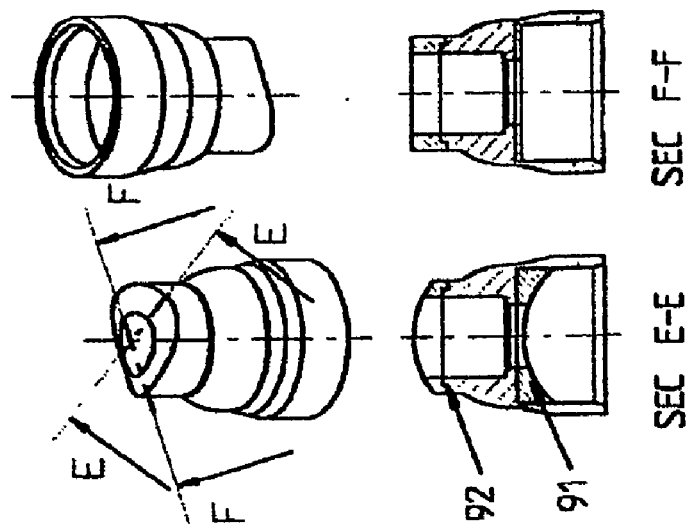
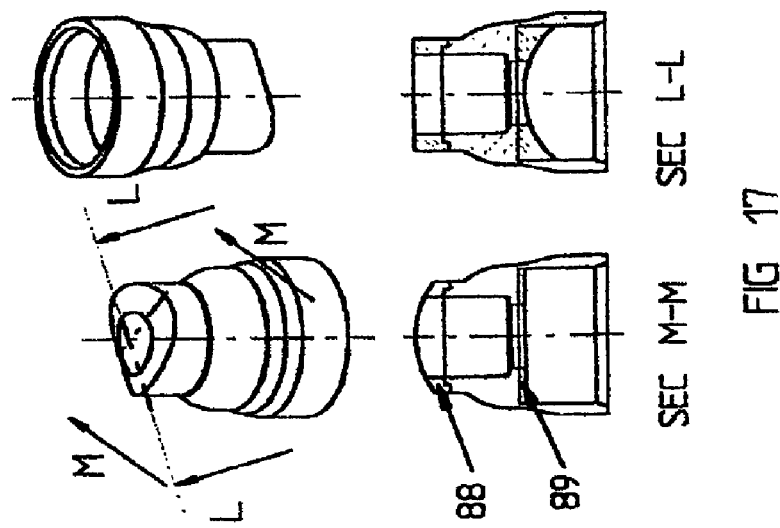
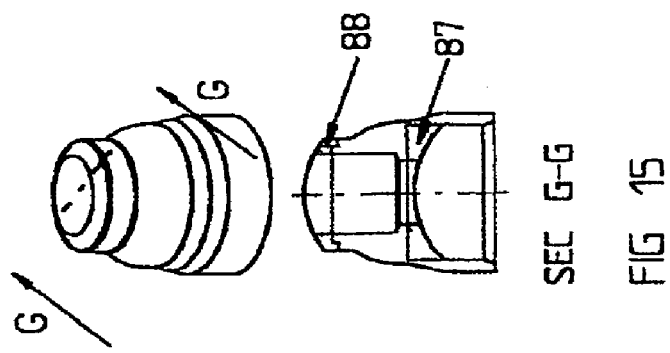

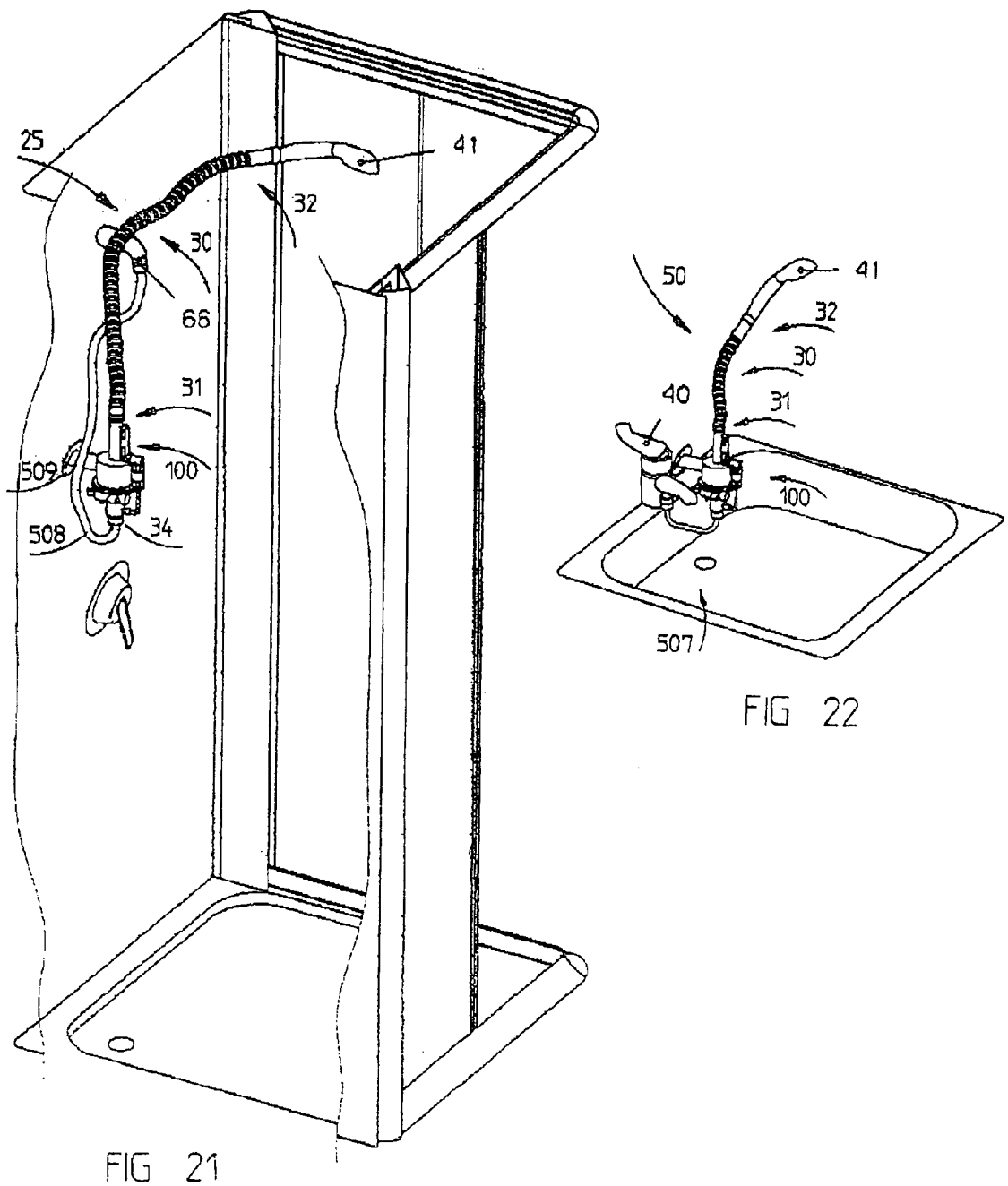

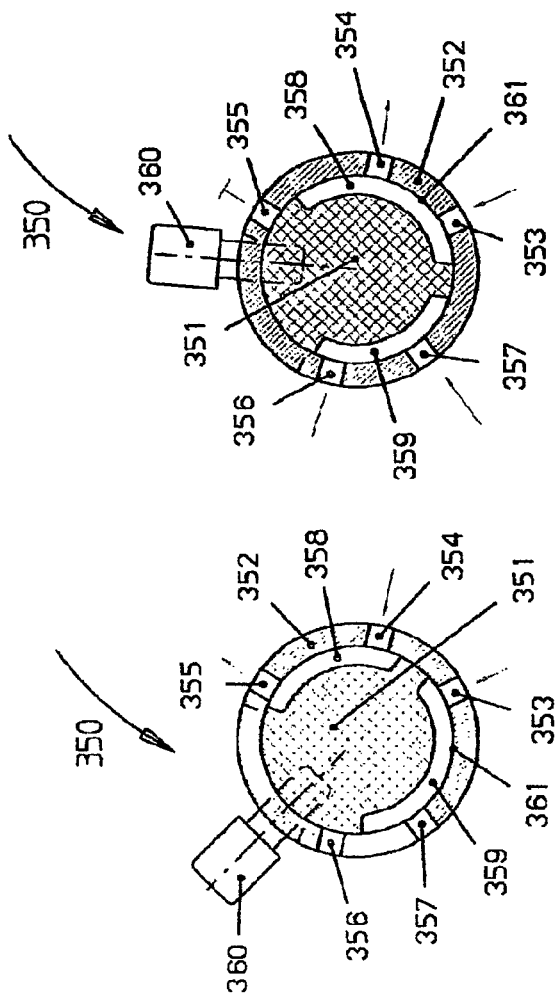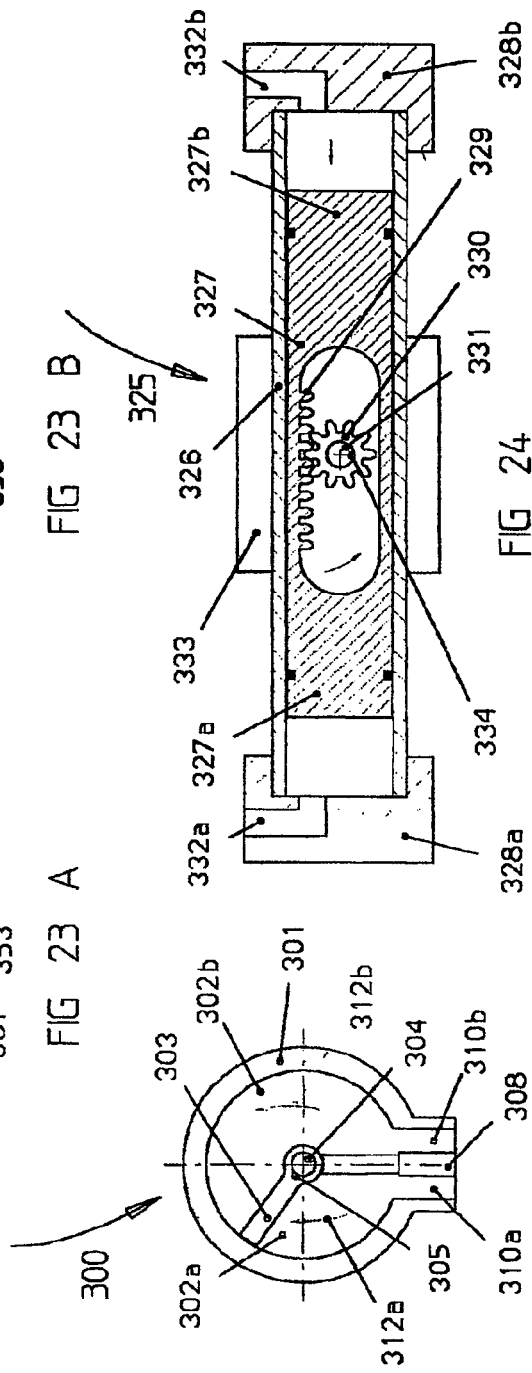

BIMODAL FLEXIBLE-RIGID HOSE

FIELD OF THE INVENTION

The present invention relates to flexible hoses. More particularly, the present invention relates to universal hose having interchangeable flexible mode and rigid mode.

BACKGROUND OF THE INVENTION

There are two main types of indoor bathing, bathing in a shower and bathing in a bathtub. In both, the person can be sprayed with water by a showerhead that is attached to the water mains through a shower hose. Basically, there are two types of shower hoses attached to showerheads. The first is a fixed showerhead that is adapted mostly for bathing in a shower and is screwed onto the top end of a shower riser. The second type includes a shower hose extension that allows movement between rigid links and by pivotal joints. These two types are well known in the art.

The shower hose extensions that are flexible are usually provided with a holder that allows suspending the sprayer when the user is bathing. Supporters were developed and as an example one can see a shower support disclosed in U.S. Pat. No. 6,276,003 "Adjustable Support for a Shower" by Knapp. The adjustable support for a shower includes a rod installed substantially in a vertical position, which is supported near its midpoint by a support bracket integrally formed with a mixing valve handle assembly. This and other similar types of supports enable the user to adjust the shower head only in one direction.

Shower hoses constructed of hollow beads were developed in order to assemble a shower hose that is more flexible and comfortable. Enhanced flexibility and applications of the hose made of jointed beads is shown in U.S. Pat. No. 5,620,352 "Flexible Tube having a Number of Joints" and in GB patent no. 2,317,641 "A Flexible Tube Made of Repeated Sections" both disclosed by Tzong. The flexible tube includes a number of joint members each having a neck portion of a reduced diameter formed between a spherical member and a semi-spherical member. The joint members have a hollow passage.

There were attempts to develop an adjustable shower hose made of joint members that allows the user to adjust the 3-D positioning of the shower head. Example of a configurable hose is disclosed in U.S. Pat. No. 6,164,570 "Self-Supporting Reconfigurable Hose" by Smeltzer. The reconfigurable self-supporting hose allows the user to select the position of the sprayer, as well as the direction of the water spray from the sprayer, or shower head. The position of the shower head and the direction of spray from the shower head can be adjusted to remain in the desired position until modified by the user. Another example is disclosed in U.S. Pat. No. 6,614,569 "Flexible Shower Arm Assembly" by Hollinshead. The patented flexible shower arm assembly allows the user to repeatedly adjust the position of the shower head in three dimensions by configuring the shape of the shower arm attached between the water source and the water dispenser. The hoses based on the principles disclosed in the patent documents are relatively rigid structures that are reconfigured manually by applying force on the parts of the hose. These types of structures are limited to relatively short arms, and fail to hold the desired structure of hose if the joints become loose.

There is a need for a hose that can be changed from a fully flexible hose to a fully rigid hose so that the hose can be reformed in a 3D structure very easily and according to specific needs.

The hose of the present invention can be used for other applications such as passageway for electrical wires or other wires that have to be transferred from one end to the other. An example for such an application is a microphone hose that can be in a rigid mode when desired and can be transferred from place to place in the flexible mode.

SUMMARY OF THE INVENTION

It is an object of the present invention to provide a bimodal flexible-rigid hose that is adapted to easily convert between a flexible mode and a rigid mode.

It is another object of the present invention to provide a bimodal flexible-rigid hose allowing the user to convert a flexible hose into a rigid hose in any direction or height so as to enable the user to direct the water spray at any direction.

It is yet another object of the present invention to provide a bimodal flexible-rigid hose in which the conversion between the flexible mode and the rigid mode is actuated in a mechanical manner or in a hydraulic manner.

It is an additional object of the present invention to provide a bimodal flexible-rigid hose made of adjacently engaged members designed so as to allow the use of a relatively long hose.

It is thus provided in accordance with a preferred embodiment of the present invention a flexible-rigid bimodal hose, said bimodal hose comprising:

a plurality of adjacently engaged hollow members defining a hose having a first end, a second end, and an elongated hollow;

a flexible tube passing through said elongated hollow extending from said first end to said second end;

a tensional means extending from said first end to said second end, wherein said tensional means have a first low tension state in which each one of said plurality of adjacently engaged hollow members is rotating in respect to neighboring hollow members and a second high tension state in which said plurality of hollow members are forced together so that there is substantially no relative movement between the hollow members;

an actuation means adapted to apply different tensile forces on said tensional means;

whereby in the first low tension state, the bimodal hose is in a flexible mode and in the second high tension state, the bimodal hose is maintained in a rigid state.

Furthermore, in accordance with another preferred embodiment of the present invention, said flexible tube is adapted to convey fluid.

Furthermore, in accordance with another preferred embodiment of the present invention, said actuation means is a mechanical actuator.

Furthermore, in accordance with another preferred embodiment of the present invention, said actuation means is a hydraulic actuator.

Furthermore, in accordance with another preferred embodiment of the present invention, said actuation means is a linear hydraulic actuator fluidically connected to water mains and wherein said tensional means is a cable and wherein a movable piston provided in said linear hydraulic actuator is connected to said cable and wherein movements of said movable piston is responsive to routing of water in said linear hydraulic actuator.

Furthermore, in accordance with another preferred embodiment of the present invention, a selector is provided, said selector is adapted to control the flow of water to said linear hydraulic actuator so as to control the movement of said movable piston.

Furthermore, in accordance with another preferred embodiment of the present invention, said water mains supplies water to said flexible tube through a bypass tube bypassing said linear hydraulic actuator.

Furthermore, in accordacne with another preferred embodiment of the present invention, at least one of said plurality of adjacently engaged hollow members having a third end in a nose portion and a fourth end in a second portion is defined by spherical face at said third end and outer annular cylindrical surface of said nose portion, a spherical outer surface between said nose portion and said second portion, an annular tapered surface at said fourth end and a cylindrical inner surface and inner spherical shoulder in said second portion.

Furthermore, in accordance with another preferred embodiment of the present invention, at least one of said plurality of adjacently engaged hollow members having a third end in a nose portion and a fourth end in a second portion is defined by convex surface at said third end and outer annular cylindrical surface of said nose portion, a spherical outer surface between said nose portion and said second portion, an annular tapered surface at said fourth end and a cylindrical inner surface and inner concaved shoulder in said second portion.

Furthermore, in accordacne with another preferred embodiment of the present invention, said convex surface is substantially parallel to said inner concaved shoulder.

Furthermore, in accordance with another preferred embodiment of the present invention, said convex surface and said inner concaves shoulder are substantially perpendicular.

Additionally, in accordance with another preferred embodiment of the present invention, said bimodal hose is connected at one end to a shower head and at a second end to water mains.

BRIEF DESCRIPTION OF THE FIGURES

In order to better understand the present invention and appreciate its practical applications, the following Figures are attached and references herein. Like components are denoted by like reference numerals.

It should be noted that the figures are given as examples and preferred embodiments only and in no way limit the scope of the present invention as defined in the appending Description and Claims.

FIG. 3 illustrates an exploded view of both ends of the mechanically actuated bimodal flexible-rigid hose shown in FIG. 1.

FIG. 4 illustrates a partial cross sectional view of the mechanical actuator of the bimodal flexible-rigid hose shown in FIG. 1, in a released state.

FIG. 5 illustrates a partial cross sectional view of the mechanical actuator of the bimodal flexible-rigid hose shown in FIG. 1, in a locked state.

FIG. 11a illustrates a cross sectional view of a hydraulic actuator in accordance with another preferred embodiment of the present invention, in a state imparts rigidity of the hose.

FIG. 11b illustrates the hydraulic actuator shown in FIG. 11a in a state that maintains the hose flexible.

FIG. 11c illustrates the D-D cross sectional view of the hydraulic actuator shown in FIG. 11d.

FIG. 11d illustrates a perspective view of the hydraulic actuator shown in FIGS. 11a-c.

FIGS. 12-17 illustrate different types of hollow members engaged in a bimodal flexible-rigid hose in accordance with preferred embodiments of the present invention.

FIG. 21 illustrates a shower provided with a hydraulically actuated bimodal flexible-rigid hose in accordance with a preferred embodiment of the present invention.

FIG. 22 illustrates a sink provided with a hydraulically actuated bimodal flexible-rigid hose in accordance with a preferred embodiment of the present invention.

FIGS. 23a-b illustrate cross sectional views of a selector to be incorporated in the hose assembly in two operating modes in accordance with another preferred embodiment of the present invention.

FIGS. 23-26 illustrate cross sectional views of hydraulic actuators to be incorporated in the hose assembly in accordance with preferred embodiments of the present invention.

DETAILED DESCRIPTION OF THE INVENTION AND FIGURES

The present invention provides a new and unique bimodal flexible-rigid hose that can be used in a wide range of applications where there is a need for a flexible hose or arm that can be easily converted by the user to a rigid hose. For example, the bimodal hose of the present invention can be used as a hand held shower arm suitable for use in a shower or a bathtub. The bimodal flexible-rigid hose can be used in the flexible mode while the hose can be "frozen" in any shape to the rigid mode in any instant in which the user wants free hands and stationary hose. The conversion between the flexible mode and the rigid mode is very easy. The user can convert the mode while the water is sprayed to a desired direction and the shower head is in a comfortable height. The user can reshape the hose or return to the flexible mode in any desired instant.

The bimodal flexible-rigid hose of the present invention comprises a plurality of adjacently engaged hollow members that form a tube defined by a first end and a second end. A flexible hose passes through the hollow in the members and extends from the first end to the second end, however, the hose can be used as a passageway for other purposes other than transferring water. The flexible hose is adapted to convey water from one end of the tube to the other end. The bimodal hose further comprises a tensional means also extending from the first end to the second end. The tensional means has two extreme positions wherein in the first position, the tensional means maintains low tension between the engaged members. Low tension between the engaged members maintains the bimodal hose in a flexible mode. In the second position of the tensional means, the engaged members are forced together so as to substantially eliminate relative movement between the members so that the bimodal hose becomes rigid.

Actuation means is provided so as to allow the conversion between the low tension state and the high tension state. Two preferred actuation means are disclosed herein; a mechanical actuator and a hydraulic actuator. The mechanical actuator comprises a push-pull handle that alternates the tensional means, which is a cable, between a loose position and a tensed position. In the hydraulic mechanism, the pressure of the water activates the tensional means.

In one aspect of the present invention, a mechanical actuator is used in order to convert the bimodal flexible-rigid hose from a flexible mode to a rigid one and vice versa.

Figure 1:
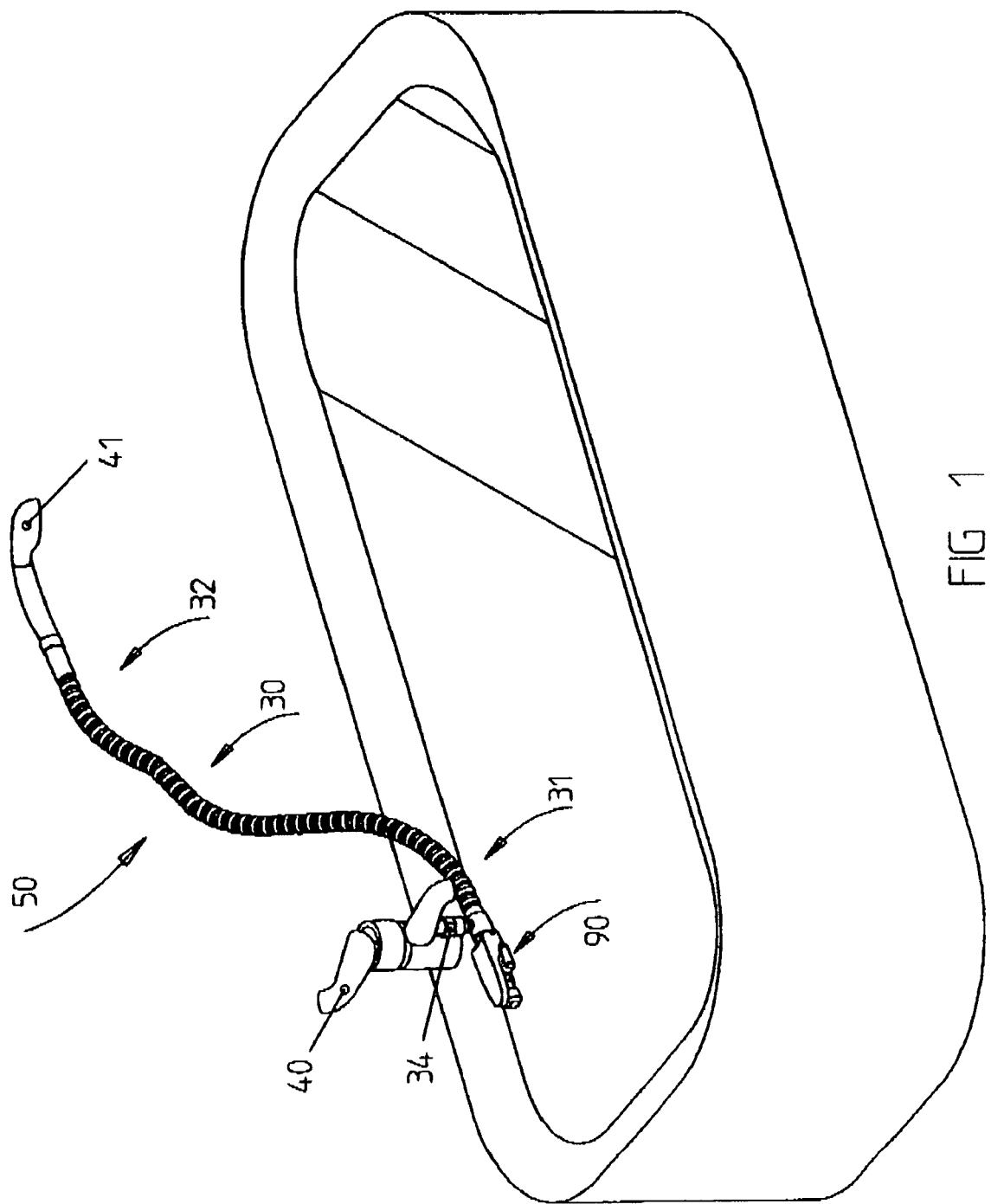
FIG. 1 illustrates a bathtub provided with a mechanically actuated bimodal flexible-rigid hose in accordance with a preferred embodiment of the present invention.

Reference is now made to FIG. 1 illustrating a bathtub provided with a mechanically actuated bimodal flexible-rigid hose in accordance with a preferred embodiment of the present invention. Shower arm assembly 50 is incorporated with a lever 40 of a bathtub. Shower arm assembly 50 comprises a bimodal hose 30 that connects the water mains to showerhead 41 while lever 40 controls the flow of the water from the mains. Bimodal hose 30 is defined by a first end 31 provided with mechanical actuator 90 and second end 32 connected to a showerhead 41. Bimodal hose 30 is formed of adjacently engages hollow members as will be comprehensively explained herein after.

Figure 2:
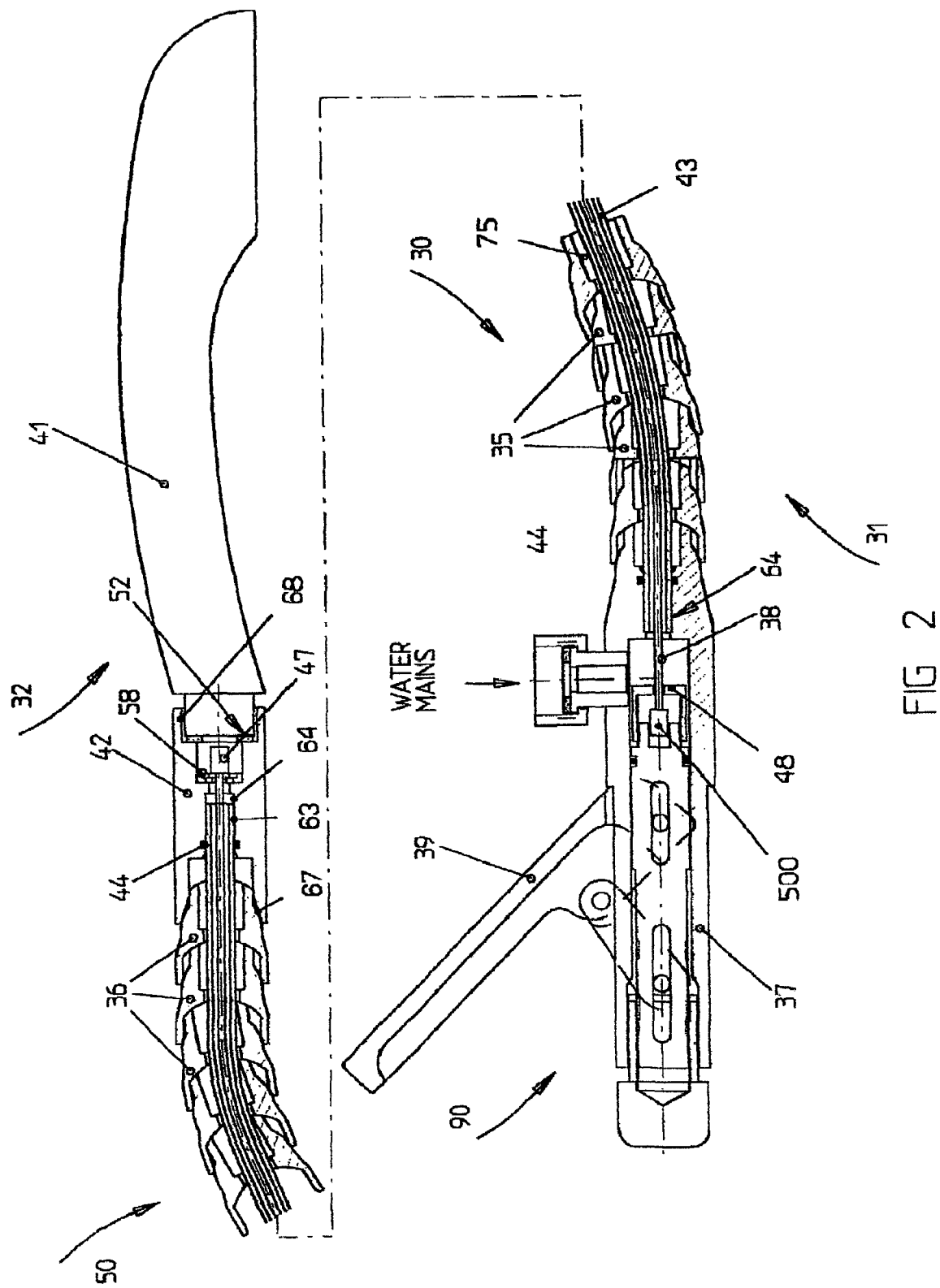
FIG. 2 illustrates a cross sectional view of both ends of the mechanically actuated bimodal flexible-rigid hose shown in FIG. 1.

Reference is now made to FIGS. 2 and 3 illustrating a cross sectional view and an exploded view, respectively, of both ends of the mechanically actuated bimodal flexible-rigid hose shown in FIG. 1. Bimodal hose 30 comprises a plurality of adjacently engaged hollow members 35 and 36 having a tapered shape so as to allow each consequent member to be partially threaded inside the hollow of its neighboring member. A flexible tube 43 pass through the hole formed in bimodal hose 30 wherein water is adapted to pass through flexible tube 43 from the water mains to showerhead 41. A cable 38 is provided substantially concentric within flexible tube 43. Cable 38 acts as a tensional means. At second end 32, cable 38 is fixedly connected. Cable 38 is provided with a cable gripper 47 that is firmly held in a connecting thread 42 that is connected to showerhead 41. A perforated retainer nut 58 and a gasket 52 confine cable gripper 47 in a stable platform-like structure.

The other end of cable 38 is movable; therefore, it is connected to mechanical actuator 90. Mechanical actuator 90 comprises an outer stable tube 37 and an inner movable tube 45 wherein cable gripper 500 is kept concentric within outer tube 37 by a flange nut 48. Outer tube 37 and inner tube 45 are both provided with corresponding bores and slots adapted to enable a lever 39 to pivot about a pin 56 that is inserted through bore 59 and corresponding slot 78 and to allow a linear movement of inner tube 45 within outer tube 37. Lever 39 is provided on both sides with two arms 54 that pivot about pin 55 inserted within slot 79 of outer tube 37 and slot 77 of inner tube 45. Pins 57 connect arms 54 to lever 39. Inner tube 45 is confined within outer tube 37 by external thread 85 that is threaded to flange nut 48 and external thread 86 that is threaded onto an adjustable cap 46. Disk 51 is provided to adjustable cap 46.

In order to better understand the mechanism of lever 39, reference is now made to FIGS. 4 and 5 illustrating partial cross sectional views of the mechanical actuator of the bimodal flexible-rigid hose shown in FIG. 1, in a released state and a locked state, respectively. In FIG. 4, lever 39 is in a released position and cable 38 is in a low tension state. In order to employ tension on cable 38, lever 39 is pivoted about pin 56 causing arms 54 to pivot about pins 57 forcing pin 55 to slide in a linear manner within slot 79. The linear movement of pin 55 pushes adjustable cap 46 that in turn pulls inner tube 45 and cable 38 so as to establish a high tensile force on the cable (high tension state).

Returning to FIGS. 2 and 3, when cable 38 is in a high tension state, hollow members 35 and 36 are forced together into a position in which there is substantially no relative movement between the members. In this state, bimodal hose 30 is rigid. In the low tension state, hollow members 35 and 36 are adapted to move one in respect to its consequent member so as to establish a flexible hose.

Outer tube 37 is provided with a bore 501 on its lateral side. The water supply that branches out of faucet 502 is connected to bore 501 through a shower pipe nut 34, a bushing 53, and a gasket 52. Water coming through pipe nut 34 flows through a portion of outer tube 37 and into flexible tube 43 and are sprayed through showerhead 41.

In another aspect of the present invention, the conversion between the flexible mode and the rigid mode is hydraulically actuated. The pressure of the water coming from the water mains is used in order to actuate a diaphragm having a position in which tensile force is employed on the tensional means so as to establish a rigid mode and a position in which there is substantially no force on the tensional means and a flexible mode of the bimodal hose is established.

Figure 6:
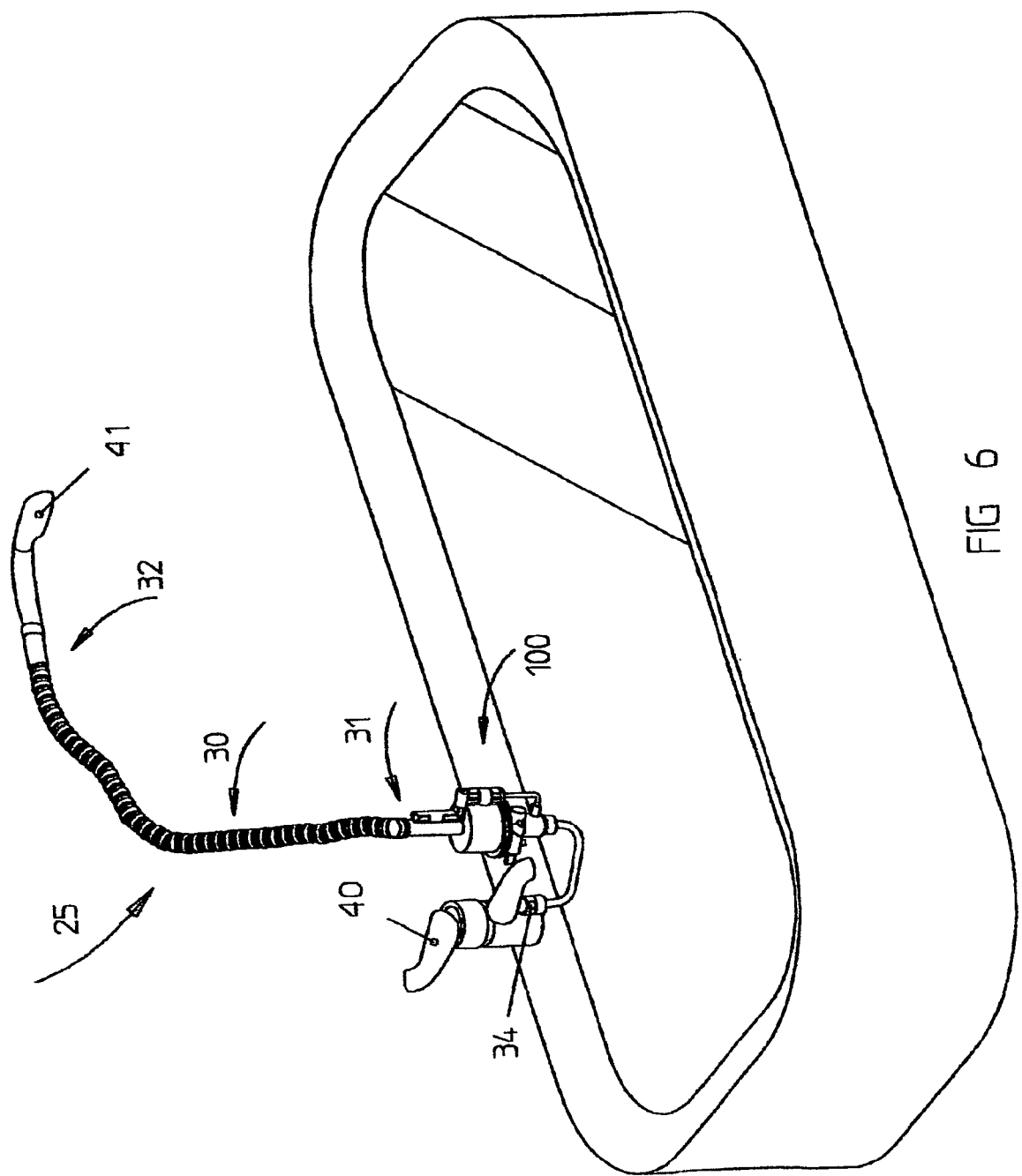
FIG. 6 illustrates a bathtub provided with a hydraulically actuated bimodal flexible-rigid hose in accordance with a preferred embodiment of the present invention.

Reference is now made to FIG. 6 illustrating a bathtub provided with a hydraulically actuated bimodal flexible-rigid hose in accordance with a preferred embodiment of the present invention. Shower arm assembly 25 is incorporated with a lever 40 of a bathtub. Shower arm assembly 25 comprises a bimodal hose 30 that connects the water mains to showerhead 41 while lever 40 controls the flow of the water from the mains. Bimodal hose 30 is defined by a first end 31 provided with hydraulic actuator 100 and second end 32 connected the showerhead 41. Bimodal hose 30 is similar in the embodiment shown herein before.

Figure 7:
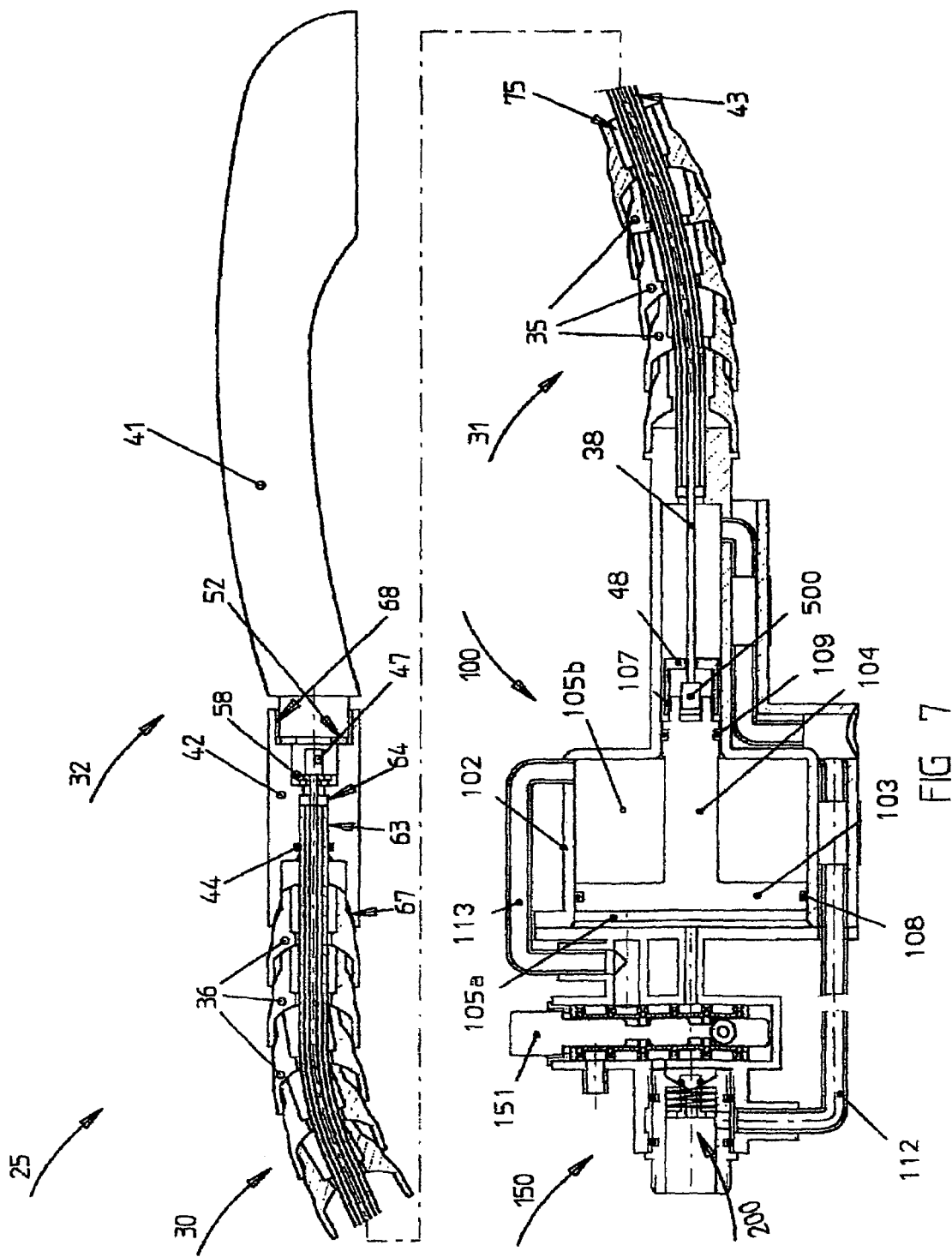
FIG. 7 illustrates a cross sectional view of both ends of the hydraulically actuated bimodal flexible-rigid hose shown in FIG. 6.
Figure 8:
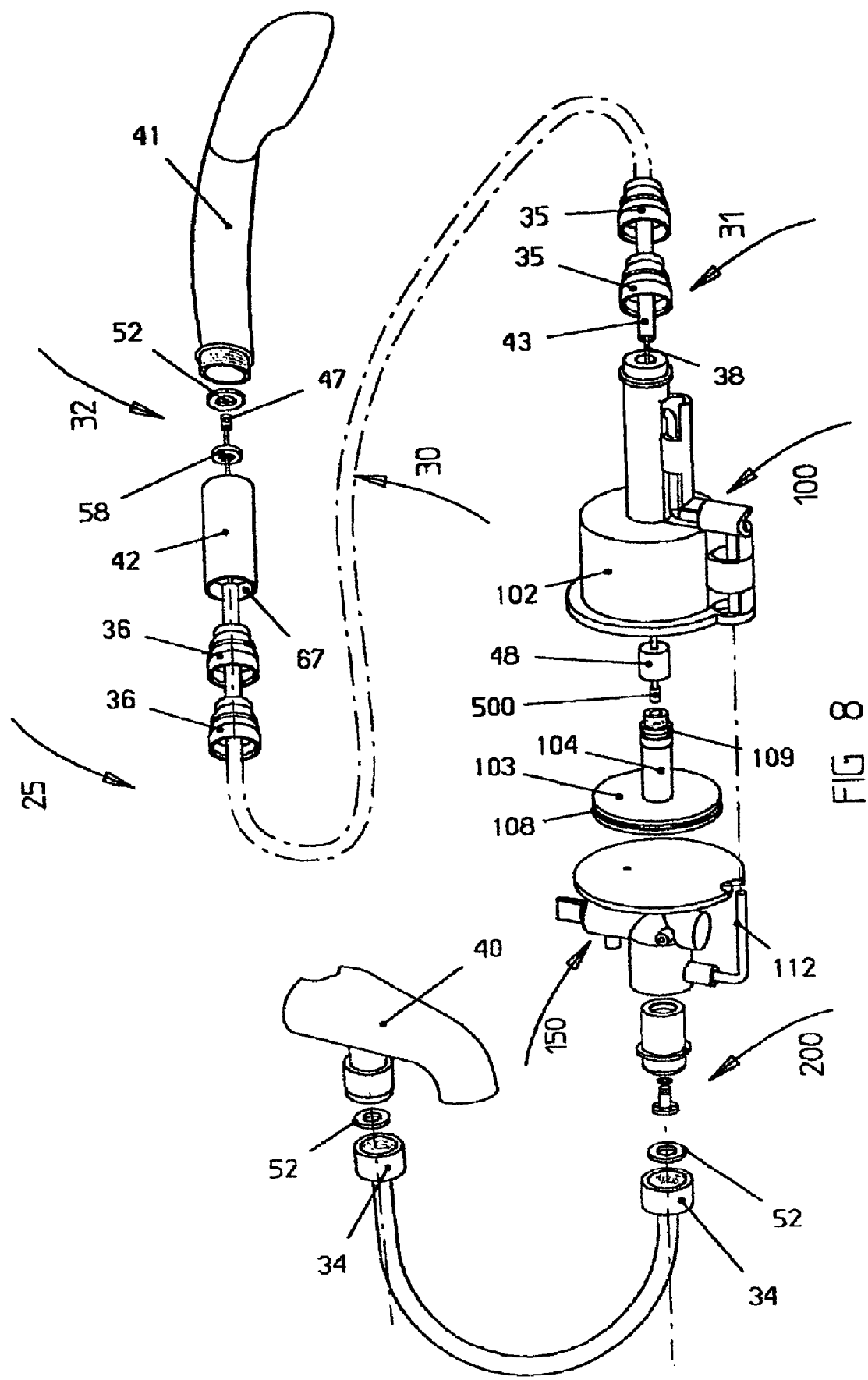
FIG. 8 illustrates an exploded view of both ends of the hydraulically actuated bimodal flexible-rigid hose shown in FIG. 6.

Reference is now made to FIGS. 7 and 8 illustrating a cross sectional view and an exploded view, respectively, of both ends of the hydraulically actuated bimodal flexible-rigid hose shown in FIG. 6. Second end 32 and its connection to showerhead 41 is similar to the embodiment described herein before. First end 31 is connected to a hydraulic actuator 100 adapted to convert cable 38 from a low tension state in which the bimodal hose is in a flexible position to a high tension state in which the bimodal hose id in a rigid position and vice versa.

Hydraulic actuator 100 comprises a housing 102 accommodating a movable piston 103. Piston 103 divides housing 102 into an upper chamber 105b and lower chamber 105a.

The piston is provided with a stem 104 that is connected to cable 38 through cable gripper 500 and nut 48, which is threaded onto stem 104 by external thread 107. Piston 103 is provided with a gasket 108 preventing the passage of water through the piston's circumference. Piston's stem 104 is provided also with a gasket 109. Water coming from the water mains through shower pipe nut 34 is directed partially through a bypass tube 112 bypassing hydraulic actuator 100 and flowing to flexible tube 43. Water directed to chambers 105a or 105b of hydraulic actuator 100 force piston 103 to move between the chambers while the volume of each chamber is changed according to the movement of the piston.

Figure 9:
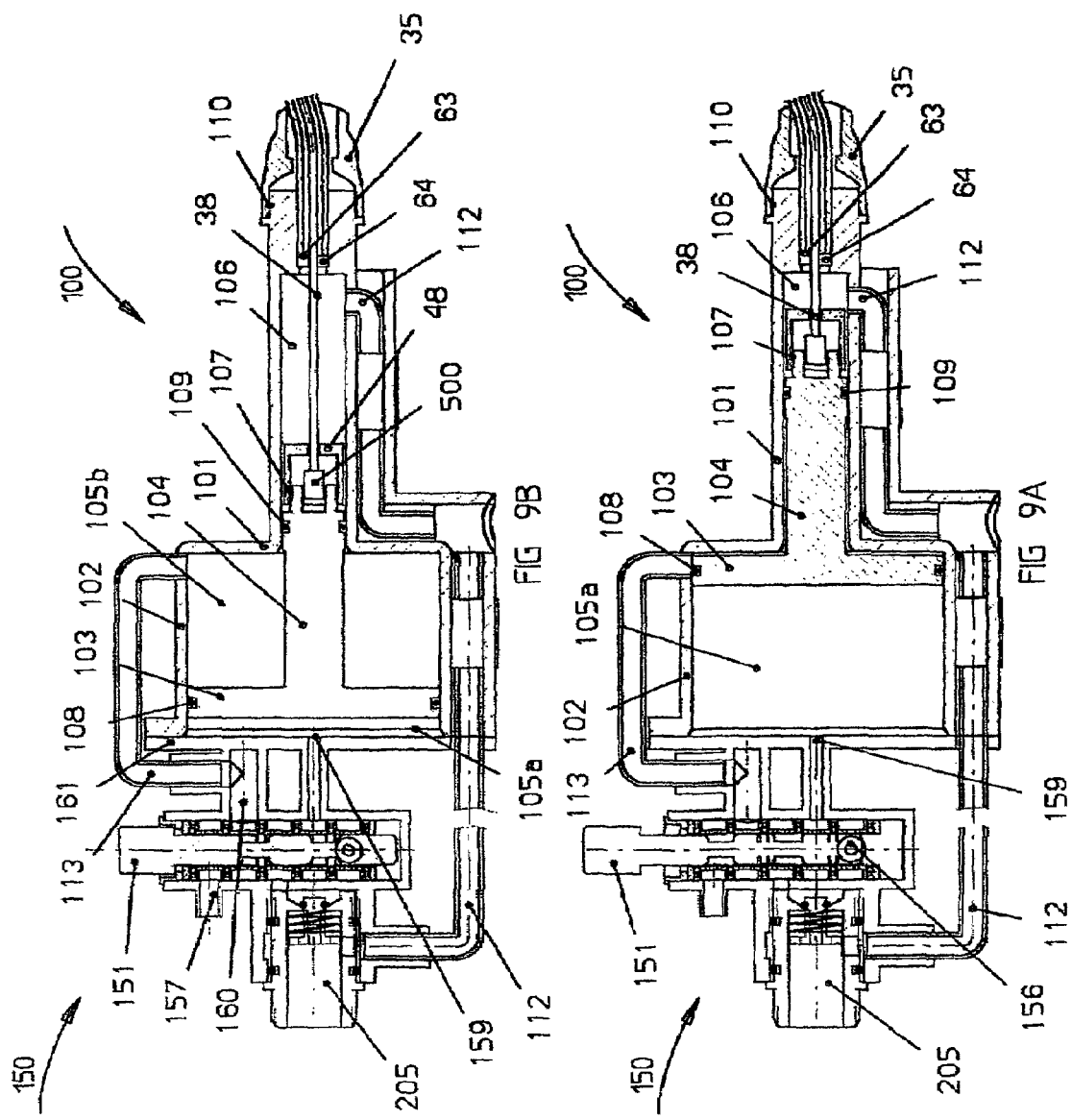
FIG. 9a illustrates a cross sectional view of the hydraulic actuator shown in FIG. 6, allowing flexibility to the hose.
FIG. 9b illustrates the hydraulic actuator shown in FIG. 9a in a state that maintains the hose in a rigid state.

In order to better understand the hydraulic mechanism, reference is now made to FIG. 9a illustrating a cross sectional view of the hydraulic actuator shown in FIG. 7, allowing flexibility to the hose, and FIG. 9b illustrating the hydraulic actuator shown in FIG. 9a in a state that maintains the hose in a rigid state. Water from the water mains passes to hydraulic actuator 100 through a linear selector 150. The user can select using selector 150 the selected mode of the hose as will be elaborated herein after. In FIG. 9b, there is water pressure from the mains towards chamber 105b and the piston is close to housing cover 161. Cable 38 is maintained in a high tension state forcing hollow members 35 and 36 together substantially with no relative movements between them. This positioning of the hollow members maintains bimodal hose in a rigid state. FIG. 9a illustrates the positioning of piston 103 when water pressures the piston to move away from housing cover 161. Selector 150 directs the water to chamber 105a that is now filled with water. In this state, cable 38 is loose and allows freedom between hollow members 35 and hollow members 36 so that a flexible mode of bimodal hose 30 is maintained.

Figure 10:
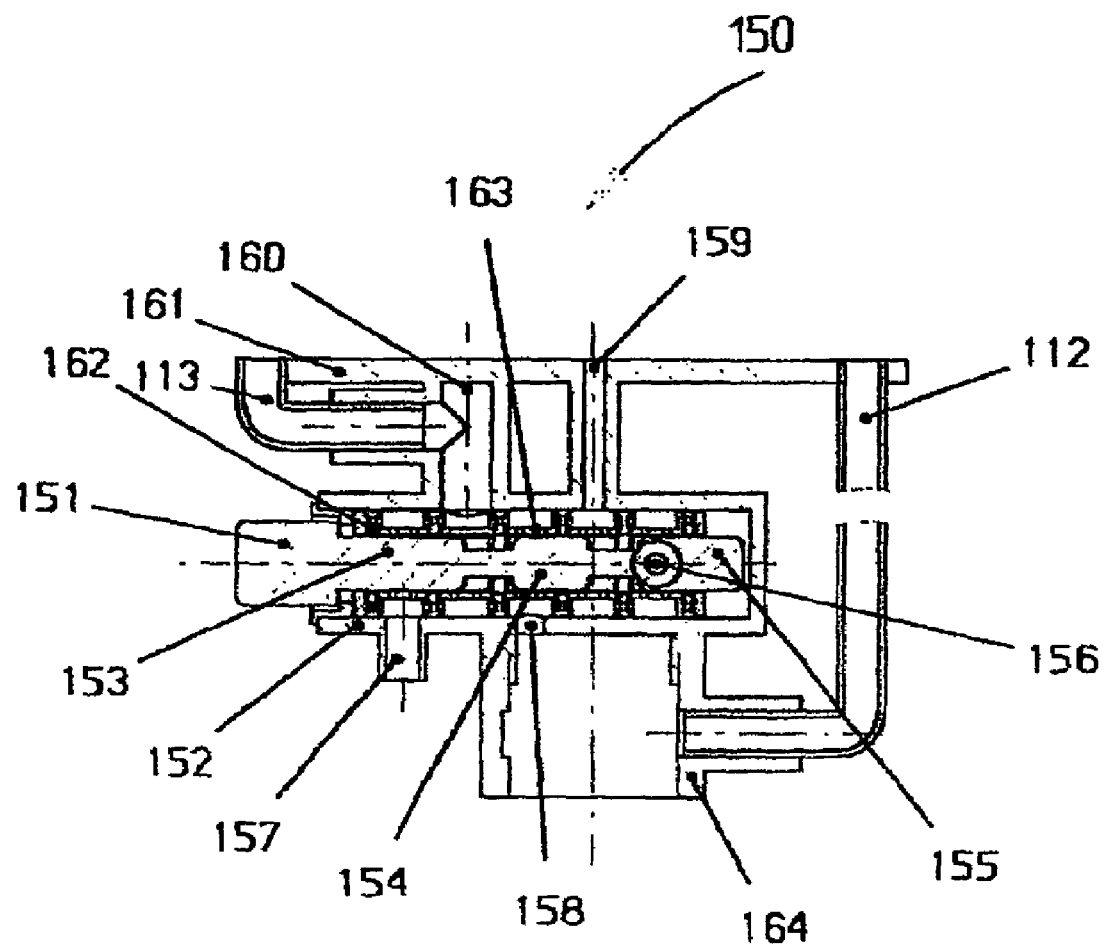
FIG. 10 illustrates an enlarged view of the linear selector used in the hydraulic actuator shown in FIG. 6.

In order to better understand the selector role, reference is now made to FIG. 10 illustrating an enlarged view of the linear selector used in the hydraulic actuator shown in FIG. 7. Selector 150 is adapted to direct the water to the corresponding side of the piston so as to select the mode of the bimodal hose. Several water passages pass through selector's housing 152. A water inlet chamber 164 is connected to the water mains and fluidically communicates between a pressurized water inlet 158 and a check valve 200 mounted in inlet chamber 164 (the check valve is clearly shown in FIGS. 7 and 9). A first pressurized outlet 159 and a second pressurized outlet 160 fluidically communicates with chambers 105a and 105b, respectively, of hydraulic actuator 100. Housing 152 is further provided with a first drain outlet 156 and a second drain outlet 157.

A plunger 151 provided within housing 152 can be moved so as to determine the flow of water through selector 150 in the following manner: in the first operation mode, plunger 151 is pushed into position shown in FIG. 9b. In this position, inlet chamber 164 is fluidically communicating with pipe connection line 113 through outlet 160. Drain 157 is fluidically blocked and drain 156 is fluidically communicating with outlet 159. In the second mode, plunger 151 is pulled into the position shown in FIG. 9a. In this state, inlet chamber 164 is fluidically communicating with outlet 159 while drain 156 is fluidically blocked and drain 157 becomes fluidically communicating with outlet 160. Selector 150 is provided with six seals 162 and five perforated spacers 163.

Other selectors such as a rotary selector or combined linear-rotary selectors can be employed in the hydraulic actuator of the present invention. An example is shown in FIGS. 23a-b illustrating a cross sectional view of a rotary selector in two operating modes. Rotary selector 350 comprises a housing 352 having an internal annular surface that is provided with several water passages: fluid inlet 353, fluid outlets 354 and 357 and fluid drains 355 and 356. Housing 352 is provided with manually rotating valve 351 that can be rotated by lever 360. Two operating modes can be established using rotary selector 350: FIG. 23a illustrates a first operating mode in which inlet 353 fluidically communicates with outlet 357 through passage 359. Drain 356 is fluidically blocked and drain 355 is fluidically communicating with outlet 354 through passage 358. In the mode illustrated in FIG. 23b, inlet 353 fluidically communicates with outlet 354 through passage 358, drain 355 is fluidically blocked and drain 356 is fluidically communicating with outlet 357 through passage 359. Connecting rotary selector 350 to hydraulic actuator 100 can enable the user to select the characteristics of his bimodal flexible-rigid hose.

Returning to FIGS. 9a and b, the conversion between the rigid mode and the flexible mode is as follows: in order to achieve a flexible mode, plunger 151 is pulled outwardly. The pressurized water supplied through check valve 200 flows to chamber 105a through outlet 159 forcing piston 103 to move away from cover 161 while the water from chamber 105b flows out via outlet 157. As a result, cable 38 is released enabling hollow members 35,36 to rotate with respect to each other and the bimodal hose 30 to be in a flexible mode. In order to convert to the rigid mode, plunger 151 is pushed inwardly causing the pressurized water supplied through check valve 200 to communicate with chamber 105b through pipe line 113 forcing piston 103 towards cover 161. Water from chamber 105a is forced out via drain outlet 156 and the water in chamber 105b cannot drain due to check valve 200. As a result, tensile force is employed on cable 38 causing hollow members 35,36 to be stacked together with no relative movements between the members so as to establish a rigid hose.

The water doesn't drain from chamber 105b also when the water supply is stopped. This is to assure that when the water is closed via valve 40, bimodal hose 30 will stay in its rigid mode and won't collapse. Returning to flexible mode is performed by the user in a controlled manner.

Reference is now made to FIG. 11a illustrating a cross sectional view of a hydraulic actuator in accordance with another preferred embodiment of the present invention, in a state that maintains the hose rigid and FIG. 11b illustrating the hydraulic actuator shown in FIG. 11a in a state that allows flexibility of the hose. Basically, hydraulic actuator 250 is similar to actuator 100, however, in hydraulic actuator 250, piston plate 253 is stationary while cylinder housing 252 is linearly movable. The piston's body is provided with bores enabling fluidal communication between the water passages in selector 150 and the hydraulic actuator 250. Hydraulic actuator is provided with two pressure chambers 258 and 259b that act simultaneously on cylinder 252 so as to actually double the effective area of the piston without increasing its diameter.

The water actuate hydraulic actuator 250 as follows: referred to FIG. 11c pressurized water is supplied from a fluid source such as water mains (not shown in the Figure) into inlet 205 and flows along line 112, bore 210 and tube 43 to showerhead 41 (shown in FIGS. 7 and 8). When the user wishes to convert bimodal hose into a rigid hose, he pushes plunger 151 inwardly (FIG. 11a). This causes the pressurized water supplied through check valve 200 and outlet 160 to fluidically communicate with chambers 258, 259b through line 211, forcing cylinder housing 252 to move away from selector 150. Water in chamber 259a are forced out via drain outlet 156. The water in chambers 258, 259b is fluidically blocked by check valve 200. As a result, a relatively high tensile force is applied on cable 38 causing bimodal hose 30 to be in a rigid state. Similarly to the principle in the former embodiment, flexibility is attained by receiving water in chamber 259a.

Reference is now made to FIG. 11d illustrating the hydraulic actuator shown in FIGS. 11a-c in a perspective view. It can be seen that in this configuration, the outer shape of the actuator is uniform.

Reference is now made to FIGS. 23-26 illustrating cross sectional views of hydraulic actuators to be incorporated in the hose assembly in accordance with preferred embodiments of the present invention. FIG. 23 illustrates a fluid operated rotary actuator 300 that can be employed in the hydraulic activated bimodal hose of the present invention. Actuator 300 comprises a housing 301 provided with rotating pointer 303 that is attached and fixed to shaft 304 by key 305. Housing 301 further comprises a buffer 308 and fluid inlet/outlet 310a and b, respectively. Directing the fluid through the actuator can be maintained by shaft rotation according to the arrow.

FIG. 24 illustrates a fluid operated rotary actuator 325 that converts linear motion into rotating motion and vice versa. Actuator 325 comprises a cylinder 326 having end caps 328 a and b having fluid inlet/outlet 332a and b, respectively. A movable engaged piston 327 having a rack 329 resides within cylinder 326. Rack 329 is meshed with circular gear teeth of a pinion 330 fixedly connected to shaft 331 by a key 334. Rack 329 is pushed in linear motion as piston 327 moves by pressurized fluid flow controlled through inlet/outlet 332 a and b, respectively, forcing pinion 330 and shaft 331 to rotate. Shaft 331 can be connected to a tensional means such as a cable in order to convert a bimodal hose as shown herein before from flexible mode to rigid mode and vice versa.

Figure 25:
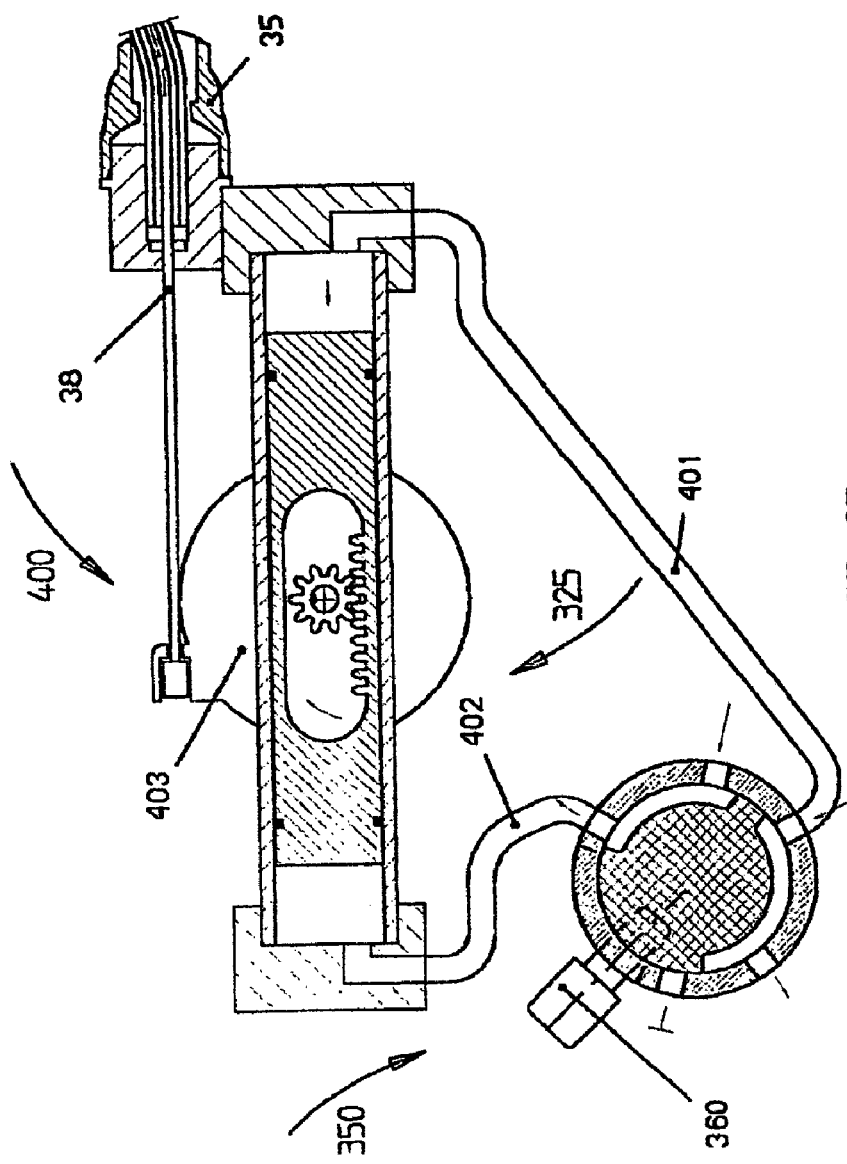

FIG. 25 illustrates another possibility of hydraulic actuator 400 in which rotary selector valve 350 that was described herein before is employed. Selector valve 350 controls the fluid flow so as to convert actuator 325 by fluid lines 401 and 402. Cable 38 of a bimodal hose is connected to pulley 403, fixedly connected to rotating shaft 331 as described herein before. Again, the actuator converts the bimodal hose from flexible mode to a rigid mode, respectively.

Figure 26:
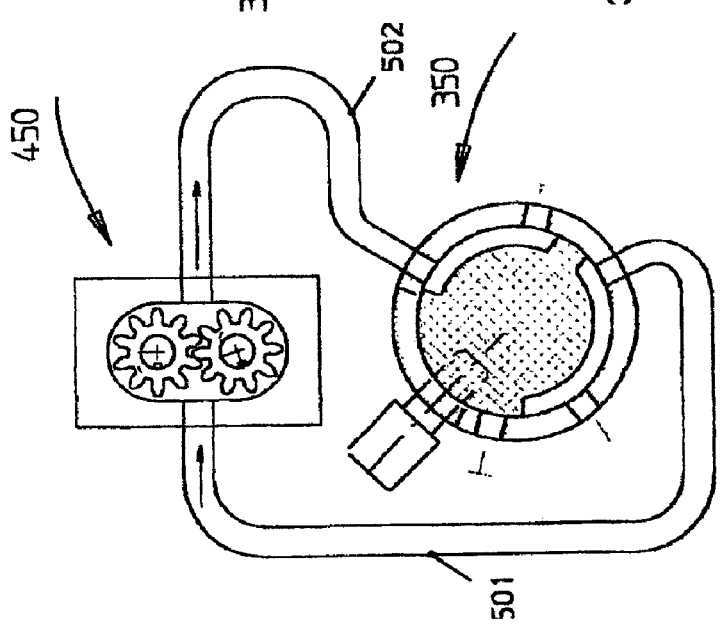

FIG. 26 illustrates another hydraulic actuator 450 wherein selector valve 350 is implemented again and controls the fluid flow through lines 501 and 502 to hydraulic motor 450. Similarly to previous embodiments, connecting the actuator to a cable provided in a bimodal hose can actuate the conversion between a flexible mode and a rigid mode.

It should be mentioned that other types of actuators can be used, mechanical, hydraulic or any other type without limiting the scope of the present invention.

Reference is now made to FIGS. 12-17 illustrating different types of hollow members engaged in a bimodal flexible-rigid hose in accordance with preferred embodiments of the present invention. FIG. 12 illustrates a hollow member 36 defined by spherical face 80 at one end, outer annular cylindrical surface 81, a spherical outer surface 71, and an internal cavity 75. The other end is defined by a tube part 82 having an annular tapered surface 72, a cylindrical inner surface 84, and inner spherical shoulder 83. Each hollow member can be pivoted and rotated with respect to adjacent hollow member on 3D basis. Outer spherical face 80 and corresponding inner spherical shoulder 83 of the adjacent member are adjacently arranged so that relative movement is prevented when the members are in the rigid mode. The extent of bending of the members one in respect to the other is limited due to a nose formed by the cylindrical portion defined by outer annular cylindrical surface 81 that rotates adjacently to cylindrical inner surface 84. The nose rotates freely within the limits determined by cylindrical inner surface 84 of tube part 82.

FIGS. 13 and 14 illustrate hollow members 35 and 33 respectively that are similarly defined, however, the rotational movement between neighboring hollow members is limited to only 2D due to asymmetry of surface 70 and inner surface 73 (concaved planes). Surface 70 can be parallel to inner surface 73 in the same manner as shown in member 33 in FIG. 14 or surface 70 can be perpendicular to inner surface 73 similar to member 35 in FIG. 13. If one uses adjacent members such as member 35 shown in FIG. 13, it is possible to form a hose in which the movement between each two consequent members is in a different plane. Alternatively, there can be any intermediate angle between surface 70 and inner surface 73 so as to accord any desired angles and possibilities of hoses rigidity.

FIGS. 15, 16, and 17 illustrate similar hollow members having inserts 87, 89 and 91, respectively. The inserts further limit the rotational movement between the hollow members. The structure of the members limits the rotational movement of the members in the interior of the other when they are engaged together. When the inner surface of the member is asymmetrical as shown in FIG. 14, members 33, the part of the hose made of such members is not rotating on a 3D basis, but only in 2D. This allows using and controlling a relatively long and thick hose.

Figure 18:
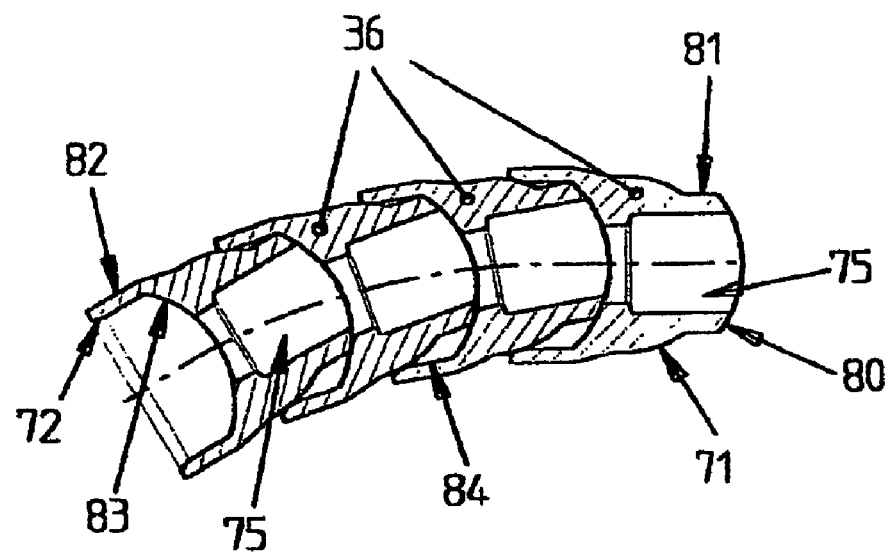
FIGS. 18-19 illustrate two types of members engaged into hoses in accordance with preferred embodiments of the present invention.
Figure 19:
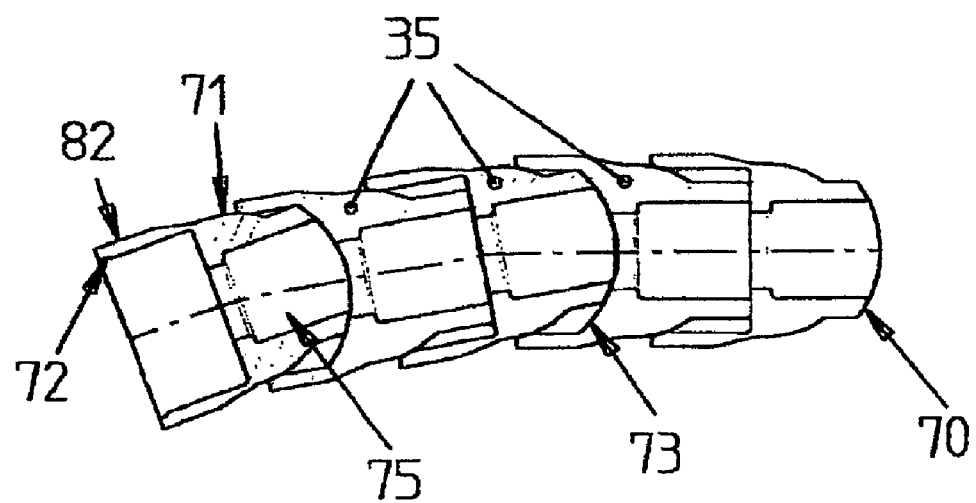

Reference is now made to FIGS. 18 and 19 illustrating two types of members engaged into a hose in accordance with preferred embodiments of the present invention. The asymmetry of the hollow members as well as the inserts is designated for preventing disengagement of the hollow beads and enable the use of relatively longer bimodal hose. FIG. 18 illustrates bent hose made of symmetrical hollow members 36 and FIG. 19 illustrates a bent hose made of asymmetrical hollow members 35.

Figure 20:
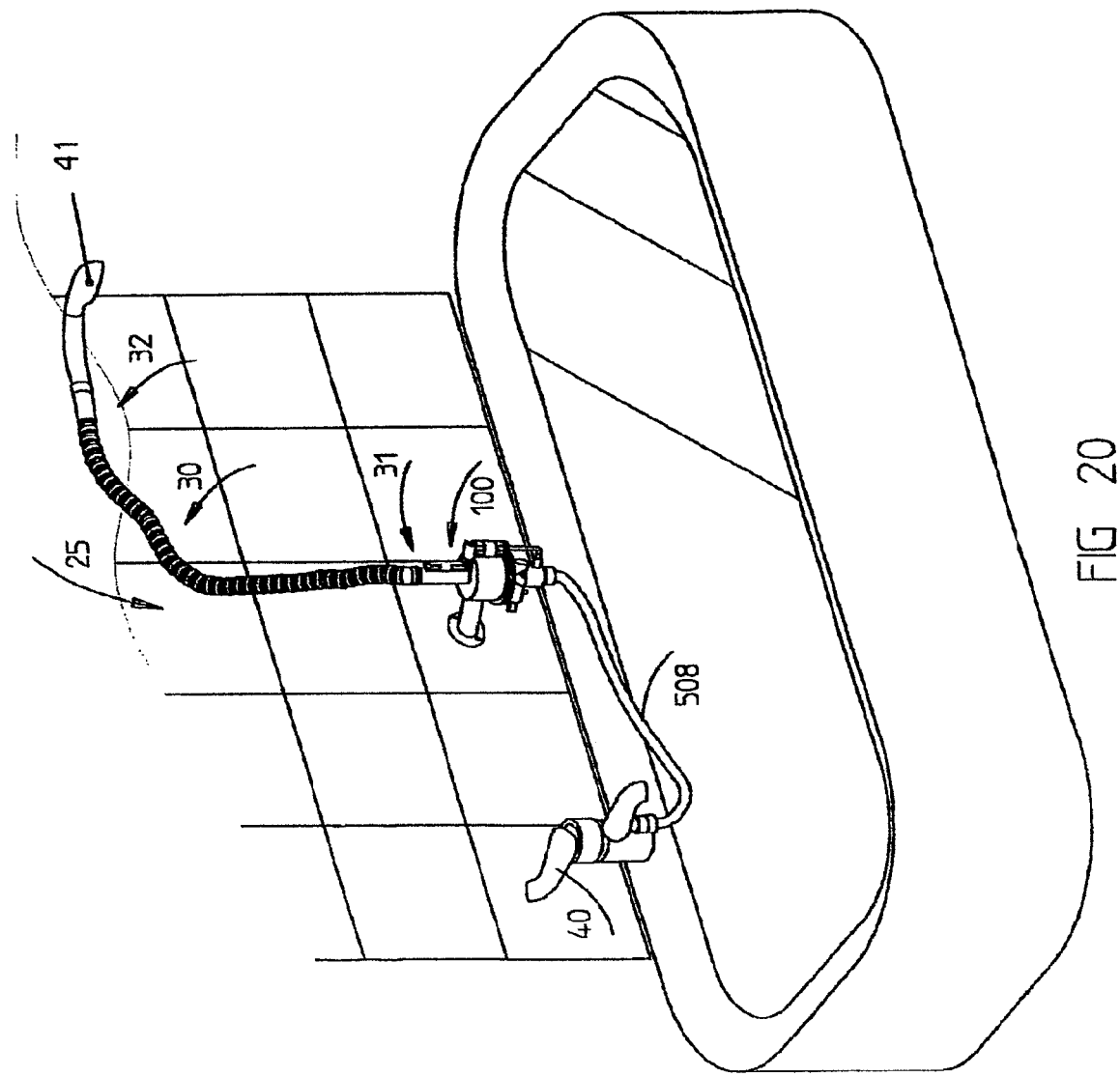
FIG. 20 illustrates a bathtub provided with a hydraulically actuated bimodal flexible-rigid hose in accordance with another preferred embodiment of the present invention.

Reference is now made to FIGS. 20, 21, and 22 illustrating a bathtub, a shower, and a sink, respectively, provided with a hydraulically actuated bimodal flexible-rigid hose in accordance with another preferred embodiments of the present invention. FIG. 20 illustrates a bathtub provided with a hydraulically actuated bimodal flexible-rigid hose. It is optional to provide an additional hose 508 between the water mains controlled by lever 40 and shower arm assembly 25. In this way, first end 31 of bimodal hose 30 and hydraulic actuator 100 can be connected to the wall or any other element that is in a distant from the water supply.

FIG. 21 illustrates a shower provided with a hydraulic actuated bimodal flexible-rigid hose. Shower arm assembly 25 can be provided also in a shower held by a support 509. Additional hose 508 connects the mains water supply to bimodal hose 30 through nut 34. Similarly, sink 507 is provided with shower arm assembly 25.

It should be clear that the bimodal flexible-rigid hose of the present invention can be used in any application other than household purposes. Due to the unique features of the bimodal hose of the present invention, the bimodal hose can be connected to any water pressure supply whether mechanically actuated or hydraulically actuated.

The hose assembly of the present invention can be used also for other purposes besides water transfer. For example, transferring electrical wires or other wires from one spot to the other can be performed in the hose of the present invention. In this case, obviously, mechanical actuator is employed.

It should be clear that the description of the embodiments and attached Figures set forth in this specification serves only for a better understanding of the invention, without limiting its scope as covered by the following Claims.

It should also be clear that a person skilled in the art, after reading the present specification can make adjustments or amendments to the attached Figures and above described embodiments that would still be covered by the following Claims.

The invention claimed is:

1. A flexible-rigid bimodal liquid conveyor hose, said bimodal hose comprising:
    a plurality of adjacently engaged hollow members defining a hose having a first end, a second end, and an elongated hollow;
    at least one flexible tube passing along said plurality of adjacently engaged hollow members, wherein said at least one flexible tube is adapted to convey fluid;
    a tensioner extending from said first end to said second end, wherein said tensioner has a first low tension state in which each one of said plurality of adjacently engaged hollow members is rotating in respect to neighboring hollow members and a second high tension state in which said plurality of hollow members are forced together so that there is substantially no relative movement between the hollow members;
    an actuator adapted to apply different tensile forces on said tensioner;
    whereby in the first low tension state, the bimodal hose is in a flexible mode and in the second high tension state, the bimodal hose is maintained in a rigid state.

2. The bimodal hose as claimed in claim 1, wherein said tensioner is a cable connected to said actuator.

3. The bimodal hose as claimed in claim 2, wherein said cable passes through said flexible tube.

4. The bimodal hose as claimed in claim 3, wherein said cable is substantially concentric in respect to said flexible tube.

5. The bimodal hose as claimed in claim 1, wherein said actuator is a mechanical actuator and said tensioner is a cable and wherein said mechanical actuator has a movable element moved by a pivoting lever wherein said movable element is connected to said cable.

6. The bimodal hose as claimed in claim 1, wherein said actuator is a hydraulic actuator.

7. The bimodal hose as claimed in claim 6, wherein said actuator is a linear hydraulic actuator fluidically connected to water mains and wherein said tensioner is a cable and wherein a movable piston provided in said linear hydraulic actuator is connected to said cable and wherein movements of said movable piston are responsive to routing of water in said linear hydraulic actuator.

8. The bimodal hose as claimed in claim 7, wherein said linear hydraulic actuator is provided with a check valve adapted to prevent drainage of water from said linear hydraulic actuator when there is no water supply.

9. The bimodal hose as claimed in claim 7, wherein said water mains supplies water to said flexible tube through a bypass tube bypassing said linear hydraulic actuator.

10. The bimodal hose as claimed in claim 6, wherein said actuator is a linear hydraulic actuator comprising a movable housing fluidically connected to water mains and wherein said tensioner is a cable connected to a piston provided in said movable housing and wherein movements of said housing are responsive to routing of water into said linear hydraulic actuator so that in the second high tension state said movable housing pushes said plurality of adjacently engages members one onto the other.

11. The bimodal hose as claimed in claim 6, wherein said hydraulic actuator is selected from a group of actuators such as rotary actuator, motors, converters and linear actuators.

12. The bimodal hose as claimed in claim 6, wherein a selector is provided, said selector is adapted to control the flow of fluid to said hydraulic actuator so as to control the operation of said hydraulic actuator.

13. The bimodal hose as claimed in claim 12, wherein said selector is selected from a group of selectors such as a linear selector and a rotary selector.

14. The bimodal hose as claimed in claim 1, wherein at least one of said plurality of adjacently engaged hollow members having a third end in a nose portion and a fourth end in a second portion is defined by spherical face at said third end and outer annular cylindrical surface of said nose portion, a spherical outer surface between said nose portion and said second portion, an annular tapered surface at said fourth end and a cylindrical inner surface and inner spherical shoulder in said second portion.

15. The bimodal hose as claimed in claim 1, wherein at least one of said plurality of adjacently engaged hollow members having a third end in a nose portion and a fourth end in a second portion is defined by convex surface at said third end and outer annular cylindrical surface of said nose portion, a spherical outer surface between said nose portion and said second portion, an annular tapered surface at said fourth end and a cylindrical inner surface and inner concaved shoulder in said second portion.

16. The bimodal hose as claimed in claim 15 wherein said convex surface is substantially parallel to said inner concaved shoulder.

17. The bimodal hose as claimed in claim 15, wherein said convex surface and said inner concaves shoulder are substantially perpendicular.

18. The bimodal hose as claimed in claim 1, wherein said bimodal hose is connected at said first end to a shower head and at said second end to water mains.

* * * * *